United States Patent [19]

Lake, Jr.

[11] Patent Number: 4,776,097
[45] Date of Patent: Oct. 11, 1988

[54] DUAL MODE ACCELERATION CONTROL FOR A PLOTTER

[75] Inventor: Ralph J. Lake, Jr., Yorba Linda, Calif.

[73] Assignee: Sanders Associates, Inc., Nashua, N.H.

[21] Appl. No.: 90,148

[22] Filed: Aug. 27, 1987

[51] Int. Cl.$^4$ .............................................. B43L 13/00
[52] U.S. Cl. ................................ 33/18.1; 346/139 C; 33/1 M
[58] Field of Search .............................. 33/18.1, 1 M; 346/139 R, 139 A, 139 B, 139 C

[56] References Cited

U.S. PATENT DOCUMENTS 3,500,154  3/1970  Arp et al. ......................... 33/18.1 X
4,070,680  1/1978  Shelley ........................ 346/139 C X
4,540,994  9/1985  Lawrence ........................ 346/139 R

*Primary Examiner*—Harry N. Haroian
*Attorney, Agent, or Firm*—Donald A. Streck; Wm. F. Porter, Jr.

[57] ABSTRACT

In a graphics plotter having motor control logic for controlling a motor employed in the process of drawing a series of vector lines comprising a plot, an improvement to the logic for applying optimum control of the motor. The length of each next vector to be drawn is first calculated. The logic for controlling the motor is then self-adjusting as a function of whether the next vector line to be drawn is a short-length vector less than a pre-established length or a long-length vector longer than said pre-established length. In particular, the invention is employed in a graphics plotter having a motor for driving a penholding apparatus along an axis and a motor controller for accelerating and driving the motor to draw a series of vector lines and the aforesaid method is employed to apply optimum acceleration to the motor and comprises the steps of calculating the length of the next vector to be drawn and applying a step acceleration to the motor to draw short-length vectors less than a pre-established length and applying a ramp acceleration to the motor to draw vectors longer than said pre-established length.

5 Claims, 2 Drawing Sheets

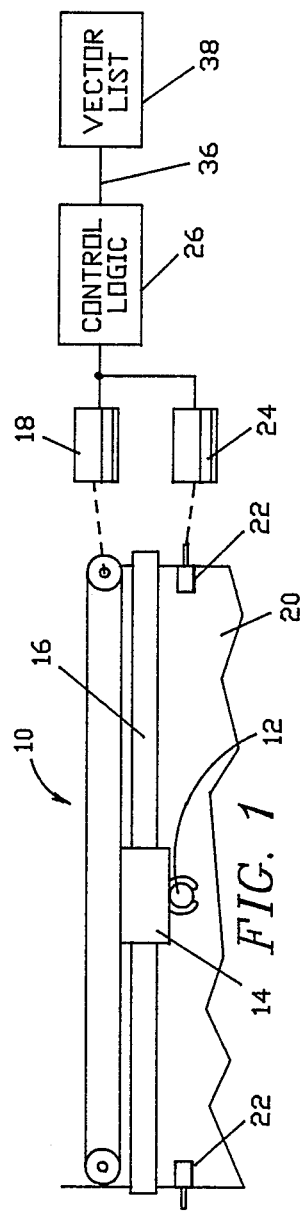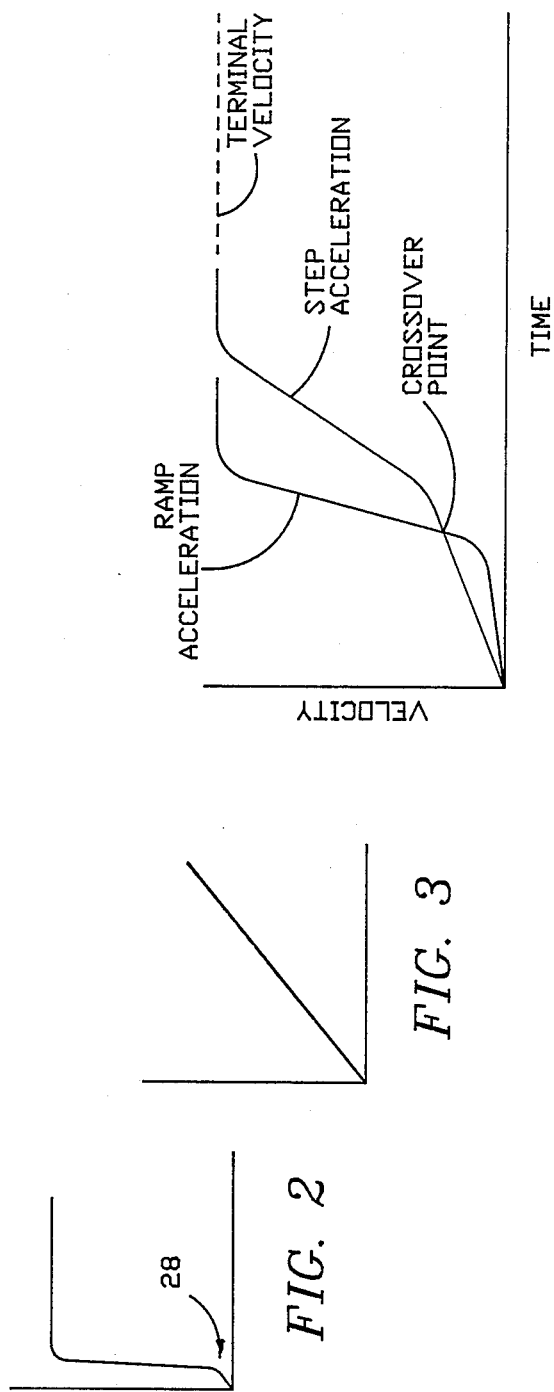

DUAL MODE ACCELERATION CONTROL FOR A PLOTTER

BACKGROUND OF THE INVENTION

The present invention relates to graphic plotters and, more particularly, in a graphics plotter having a motor for driving a penholding apparatus along an axis and a motor controller for accelerating and driving the motor to draw a series of vector lines, to the method for applying optimum acceleration to the motor comprising the steps of calculating the length of the next vector to be drawn; and, applying a step acceleration to the motor to draw short-length vectors less than a pre-established length and applying a ramp acceleration to the motor to draw vectors longer than said pre-established length.

A typical graphics plotter mechanism is shown in simplified form in FIG. 1. In the plotter 10, a pen 12 is gripped by a penholding mechanism 14 which is slidably mounted on a beam 16. The penholding mechanism 14 is moved along the beam 16 by a first motor 18 to create one axis of the two-dimensional plot on paper 20. Paper 20 is moved perpendicularly to the beam 16 under the penholding mechanism 14 by a pair of pinchrollers 22 driven by a second motor 24 to create the other axis of the plot. Both motors 18, 24 are controlled by the control logic 26.

In the prior art, the motors 18, 24 have been accelerated according to one of two methods as preferred by the manufacturer of the plotter. FIG. 2 depicts a step acceleration curve. A momentary low level of power is applied to the motor as indicated at 28 to bring the moving parts of the plotter's mechanism up to "creep speed" (i.e., to overcome the starting inertia) after which maximum power is applied to the motor in a step or square wave manner as shown in the figure. Such step acceleration techniques apply a maximum shock to the components of the system and, therefore, because of costs of a design with the ability to withstand continued high G forces, typically acceleration is limited to lower levels to prevent long term damage to the components.

The second type of motor control typically applied in prior art plotters is a ramped acceleration as shown in FIG. 3. In this approach, the power is smoothly increased over time until at the maximum level. This smooth acceleration permits higher acceleration forces to be employed in a non-heavy duty, lower cost construction without damage to the plotter's components.

A velocity versus time graph of the two approaches is shown in overlay form in FIG. 4. The graph of FIG. 4 depicts, for example, the velocity of the penholding mechanism 14 when accelerated according to the two techniques of FIGS. 2 and 3. It should be remembered that the step acceleration is shown at lower G forces while the ramp acceleration is shown at higher G forces. As can be seen, initially the step acceleration increases in velocity faster than the ramp acceleration. After the cross-over point, however, the ramp acceleration curve moves more quickly to the terminal velocity than does the step acceleration curve. This has important ramifications which, heretofore, have gone unrecognized in the art. All so-called X-Y plotters plot the drawings that they create as a series of straight line vectors. The smoothness of apparently curved and angled lines is a function of the resolution of the plotter; that is, the smallest steps in which the motors 18, 24 can move. If the increments are very small, such as 0.001 inch, the lines, circles and curves all appear quite smooth. With larger steps of resolution (e.g. 0.005 inch), the vectors exhibit what is often referred to as "the jaggies"; that is, the intended curves and angled lines are visibly composed of a series of straight line steps. Basically, the vector lines fall into two classifications as indicated in FIGS. 5 and 6. In FIG. 5, we see two long vector lines 30. One extends between coordinate points A and B while the other extends between coordinate points B and C. The time to draw the long lines 30 is beyond the cross-over point on the velocity curves of FIG. 4. Thus, maximum through-put of the plotter can be achieved by employing the ramped acceleration of FIG. 3 on the motors 18, 24. By contrast, in FIG. 6, we see alpha-numeric text 32 wherein the letters of the text 32 are created by a series of very small vector lines 34 taking much less time to create than the time to reach the cross-over point in FIG. 4. Thus, maximum through-put can be achieved by employing the step acceleration of FIG. 2 to the motors 18, 24.

Additionally, it appears that while a high G step acceleration, in general, might be damaging to the mechanism if a given plotter over the long term, that same mechanism could withstand the same high G's of acceleration in the creation of small vector lines such as those employed to create text 32 without any long term detrimental effect to the plotter's mechanism. To do so, of course, would also greatly increase the through-put of the plotter in creating text.

Wherefore, it is the object of the present invention to provide a dual mode acceleration control for a plotter taking advantage of the benefits of both types of acceleration heretofore employed only independently by the prior art.

It is another object of the present invention to provide a new manner of motor control within graphics plotters employing the looking ahead at the characteristics of the next vector to be plotted and the modification of the control of the motor as a function of those characteristics.

Other objects and benefits of the present invention will become apparent from the description contained hereinafter when taken in conjunction with the accompanying drawing figures.

SUMMARY

The foregoing objects have been realized in a graphics plotter having motor control logic for controlling a motor employed in the process of drawing a series of vector lines comprising a plot, by the improvement of the present invention for applying optimum control to the motor comprising, means for calculating the length of each next vector to be drawn and means for adjusting the motor control logic as a function of whether the next vector line to be drawn is a short-length vector less than a pre-established length or a long-length vector longer than said pre-established length.

In the preferred embodiment as described herein, the graphics plotter has a motor for driving a penholding apparatus along an axis and a motor controller for accelerating and driving the motor to draw a series of vector lines and the present invention for applying optimum acceleration to the motor comprises means for calculating the length of the next vector to be drawn and means for applying a step acceleration to the motor to draw short-length vectors less than a pre-established length and for applying a ramp acceleration to the motor to draw vectors longer than said pre-established length.

DESCRIPTION OF THE DRAWINGS

FIG. 1 is a simplified plan view of the plotting mechanism of a graphics plotter as wherein the present invention is employed.

FIG. 2 is a graph showing a step acceleration curve as employed in the prior art.

FIG. 3 is a graph showing a ramped acceleration curve as employed in the prior art.

FIG. 4 is a graph of velocity versus time showing results of the two accelerations of FIGS. 2 and 3 for comparison purposes.

DESCRIPTION OF THE PREFERRED EMBODIMENT

The present invention is based on the fact that, for each plotter, the cross-over point of FIG. 4 can be determined as a function of vector line length. Using that knowledge, the control logic 26 of the apparatus of FIG. 1 can be made to accelerate the motors 18, 24 according to the mode (i.e., step or ramp) which will maximize through-put. More broadly stated, the present invention employs a technique for the control of motors employed in the plotting mechanism not heretofore employed in the art of plotter motor control—looking ahead at the characteristics of the next vector to be drawn and controlling the motors as a function of those characteristics. While the motors 18, 24 and their acceleration are described in detail hereinafter by way of example, those skilled in the art will recognize that the novel look-ahead technique of motor control based on vector length (or other attributes) could also be applied to other motors employed within a graphics plotter such as, for example, a motor used to raise and lower the penholding apparatus in a controlled manner. Accordingly, it is applicant's intention and desire that the application and appended claims be accorded a breadth in keeping with the scope and spirit of the invention disclosed herein and not be limited by the particular example employed.

In the prior art, the control logic 26 merely responded to the coordinate points defining the next vector and applied the same control algorithm to the motors 18, 24 regardless of the characteristics of the vector to be drawn. By the present invention, intelligence has been added to the control logic 26 which, until this time, had no ability to modify the manner in which the motors 18, 24 were controlled to change and improve the through-put of the plotter 10.

As further represented by the simplified drawing of FIG. 1, during operation, the plotter 10 is provided with a series of vectors on line 36 from a vector list 38. This, of course, is a simplified representation; however, the end result of importance is that the control logic 26 is presented with the beginning and ending coordinates of each vector line to be drawn prior to actually drawing that line. Accordingly, by incorporating the look-ahead logic of FIG. 7 within the control logic 26, it is possible to accomplish the objectives of the present invention.

Figure 6:
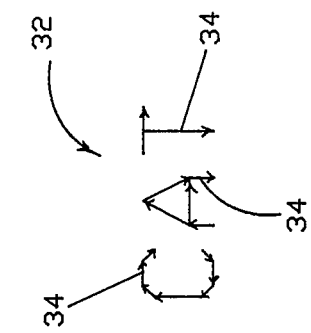
FIG. 6 is a simplified drawing showing the manner in which text, and the like, is created by a series of very small vector lines.
Figure 5:
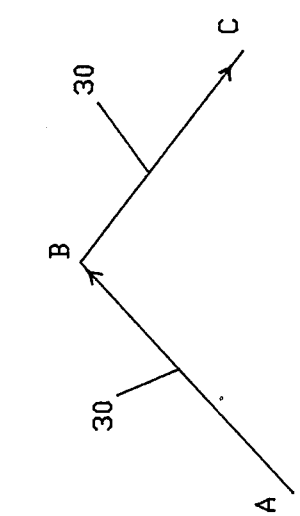
FIG. 5 is a simplified drawing showing typical long line vectors in a plot.
Figure 7:
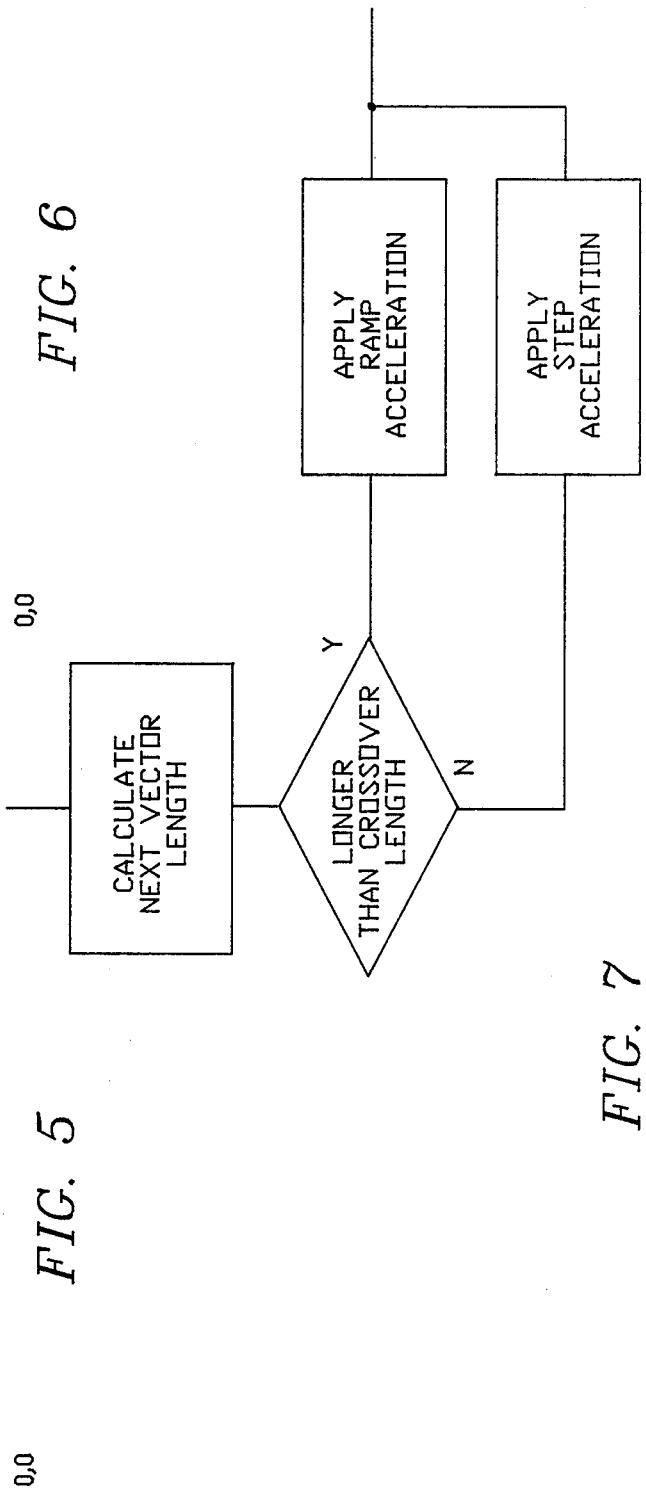
FIG. 7 is a logic diagram of logic as incorporated into the control logic for driving the motors in a plotter to accomplish the present invention.

Turning with particularity to the logic of FIG. 7, as the control logic 26 receives each next vector's beginning and ending coordinates, it first calculates the length of the next vector. Employing the previously established length reference for the cross-over point of FIG. 4 based on the acceleration power to be employed, the logic next checks to see if the vector length as just calculated is longer than the cross-over length or shorter than the cross-over length. If longer, a ramp acceleration is applied to the motors 18, 24 to draw the vector. If shorter, a step acceleration is employed with, most likely, a lower level of acceleration. The level of acceleration, of course, can also be adjusted to a desired level in keeping with the type of acceleration being applied (i.e. step or ramp), if desired. As those skilled in the art will recognize, while the look-ahead logic of the present invention is primarily directed to the acceleration of the motors 18, 24, as hereinbefore described, in particular plotter embodiments other aspects of the control of the motors therein could be beneficially affected by an analysis of the vector lines to be drawn prior to their being drawn so as to beneficially control the motors and optimize plotter performance. For example, where motor control is employed to raise and lower the penholding mechanism 14 to raise and lower the pen 12 therein in moving between vector lines without drawing, in certain applications the controlling of the motor to drop the pen 12 in a different manner as a function of vector length might be beneficial.

Those skilled in the art will also recognize that a dual mode acceleration according to the present invention can be applied to longer vector lines by considering each vector as a compound vector consisting of a short initial portion up to the crossover point plus a remaining longer portion and accelerating the penholding mechanism 14 accordingly. That is, the penholding mechanism 14 can be accelerated at a lower G force for the initial portion of the vector up to the crossover point and thereafter be accelerated for the longer portion at a higher G force up to its terminal velocity.

Wherefore, having thus described my invention, I claim:

1. In a graphics plotter having a motor for driving a penholding apparatus along an axis and a motor controller for accelerating and driving the motor to draw a series of vector lines, the improvement for applying optimum acceleration to the motor comprising:
   (a) means for calculating the length of the next vector to be drawn; and,
   (b) means for applying a step acceleration to the motor to draw short-length vectors less than a pre-established length and for applying a ramp acceleration to the motor to draw long-length vectors longer than said pre-established length.

2. In a graphics plotter having a motor for driving a penholding apparatus along an axis and a motor controller for accelerating and driving the motor to draw a series of vector lines, the method for applying optimum acceleration to the motor comprising the steps of:
   (a) calculating the length of the next vector to be drawn; and,
   (b) applying a step acceleration to the motor to draw short-length vectors less than a pre-established length and applying a ramp acceleration to the motor to draw long-length vectors longer than said pre-established length.

3. In a graphics plotter having motor control logic for controlling a motor employed in the process of drawing a series of vector lines comprising a plot, the improvement for applying optimum control to the motor comprising:
  (a) means for calculating the length of each next vector to be drawn; and,
  (b) means for adjusting the motor control logic as a function of whether the next vector line to be drawn is a short-length vector less than a pre-established length or a long-length vector longer than said pre-established length.

4. In a graphics plotter having motor control logic for controlling a motor employed in the process of drawing a series of vector lines comprising a plot, the improvement to the logic for applying optimum control to the motor comprising including therein the steps of:
  (a) calculating the length of each next vector to be drawn; and,
  (b) adjusting the motor control logic as a function of whether the next vector line to be drawn is a short-length vector less than a pre-established length or a long-length vector longer than said pre-established length.

5. In a graphics plotter having motor control logic for controlling a motor employed in the process of drawing a series of vector lines comprising a plot, the improvement to the logic for applying optimum control to the motor comprising including therein the steps of:
  (a) determining the characteristics of each next vector to be drawn; and,
  (b) adjusting the motor control logic as a function of the characteristics of the next vector line to be drawn.

* * * * *